(12) United States Patent
Choi

(10) Patent No.: US 11,299,017 B2
(45) Date of Patent: Apr. 12, 2022

(54) APPARATUS FOR CONTROLLING CURTAIN OF VEHICLE

(71) Applicant: Hyundai Motor Company, Seoul (KR)

(72) Inventor: Sung Ho Choi, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/472,135

(22) Filed: Aug. 28, 2014

(65) Prior Publication Data

US 2015/0174990 A1 Jun. 25, 2015

(30) Foreign Application Priority Data

Dec. 20, 2013 (KR) .................. 10-2013-0160442

(51) Int. Cl.
*B60J 1/20* (2006.01)

(52) U.S. Cl.
CPC .............. *B60J 1/2011* (2013.01); *B60J 1/208* (2013.01); *B60J 1/2016* (2013.01); *B60J 1/2069* (2013.01); *B60J 1/2086* (2013.01)

(58) Field of Classification Search
CPC ...... B60J 1/2011; B60J 1/2016; B60J 1/2086; B60J 1/2069; B60J 1/208; B60J 1/20; B60J 5/04; B60R 16/02; A47H 1/08
See application file for complete search history.

(56) References Cited

U.S. PATENT DOCUMENTS

| | | | | |
|---|---|---|---|---|
| 5,467,266 A | * | 11/1995 | Jacobs | H04L 61/2092 160/1 |
| 7,111,952 B2 | * | 9/2006 | Veskovic | E06B 9/32 160/5 |
| 2004/0065101 A1 | * | 4/2004 | Krupp | B60H 1/00478 62/244 |
| 2008/0185886 A1 | * | 8/2008 | Li | B60N 2/4876 297/217.3 |
| 2011/0036508 A1 | * | 2/2011 | Lin | B60J 1/2016 160/7 |
| 2012/0261079 A1 | * | 10/2012 | Chambers | E06B 9/32 160/6 |

FOREIGN PATENT DOCUMENTS

| | | |
|---|---|---|
| JP | 2003-154890 A | 5/2003 |
| JP | 2005-022507 A | 1/2005 |
| JP | 2008-137494 A | 6/2008 |

(Continued)

*Primary Examiner* — Daniel P Cahn
*Assistant Examiner* — Abe Massad
(74) *Attorney, Agent, or Firm* — Morgan, Lewis & Bockius LLP

(57) ABSTRACT

An apparatus for controlling a curtain of a vehicle includes a back seat monitor configured to provide an image of an occupant and a vehicle-mounted curtain configured to block out external light. An illumination sensor is configured to detect illumination of the external light. An occupant detecting sensor is configured to detect a boarding status of the occupant. A curtain actuator is configured to automatically control an operation of the vehicle-mounted curtain according to the boarding status of the occupant and a reference illumination value in an automatic mode and according to an operational status of the back seat monitor and the reference illumination value during a manual mode.

10 Claims, 4 Drawing Sheets

(56) References Cited

FOREIGN PATENT DOCUMENTS

| | | |
|---|---|---|
| KR | 10-1998-041147 A | 8/1998 |
| KR | 2002-044568 A | 6/2002 |
| KR | 10-2006-0063298 A | 6/2006 |
| KR | 10-2006-0078416 A | 7/2006 |
| KR | 10-0980951 B1 | 9/2010 |
| KR | 10-2011-0112182 A | 10/2011 |

* cited by examiner

APPARATUS FOR CONTROLLING CURTAIN OF VEHICLE

CROSS-REFERENCE TO RELATED APPLICATION

This application claims the benefit of priority to Korean Patent Application No. 10-2013-0160442 filed in the Korean Intellectual Property Office on Dec. 20, 2013, the entire contents of which are incorporated herein by reference.

TECHNICAL FIELD

The present disclosure relates to an apparatus for controlling a curtain of a vehicle. More particularly, the present disclosure relates to an apparatus for controlling a curtain of a vehicle, which automatically actuates the vehicle-mounted curtain according to illumination of external light and a boarding status of an occupant.

BACKGROUND

Generally, a vehicle-mounted curtain is mounted on a back seat of a vehicle for the passenger convenience and blocks light coming into the vehicle. The vehicle-mounted curtain includes a rear curtain mounted on a rear window of the vehicle and rear side curtains respectively mounted on left and right side windows of the back seat of the vehicle.

The vehicle-mounted curtain may be manually operated by a passenger or automatically operated by a drive motor and an operating switch. In addition, an automatic vehicle-mounted curtain, which includes an illumination sensor on left and right side windows of the back seat of the vehicle for detecting external light and operates automatically in accordance with a quantity of external light, has been recently developed.

The automatic vehicle-mounted curtain as stated above may be operated unnecessarily even without a passenger's presence.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an apparatus for controlling a curtain of a vehicle having advantages of actuating a vehicle-mounted curtain automatically according to illumination of external light and a boarding status of an occupant.

According to an exemplary embodiment of the present disclosure, an apparatus for controlling a curtain of a vehicle includes a back seat monitor configured to provide an image of an occupant and a vehicle-mounted curtain configured to block out external light. The apparatus may include an illumination sensor configured to detect illumination of the external light. An occupant detecting sensor is configured to detect a boarding status of the occupant. A curtain actuator is configured to automatically control an operation of the vehicle-mounted curtain according to the boarding status of the occupant and a reference illumination value in an automatic mode and according to an operational status of the back seat monitor and a reference illumination during a manual mode.

The curtain actuator may turn on the illumination sensor in the automatic mode and control the operation of the vehicle-mounted curtain by comparing the illumination of the external light detected by the illumination sensor with the reference illumination value when the occupant sits in the back seat.

The curtain actuator may actuate the vehicle-mounted curtain if the illumination of the external light is greater than or equal to the reference illumination value, and change the automatic mode into the manual mode if the illumination of external light is less than the reference illumination value.

The curtain actuator may actuate the illumination sensor when the back seat monitor is turned on and control the operation of the vehicle-mounted curtain by comparing the illumination of the external light detected by the illumination sensor with the reference illumination value.

The curtain actuator may actuate the vehicle-mounted curtain if the illumination of the external light is greater than or equal to the reference illumination value and change the automatic mode into the manual mode if the illumination of the external light is less than the reference illumination value.

The illumination sensor may be mounted on a dashboard of the vehicle.

The apparatus may further include an illumination setting button configured to set the reference illumination value by selecting a plurality of illumination values.

The apparatus may further include a mode setting button including a first button configured to set either the automatic mode or the manual mode.

The vehicle-mounted curtain may include a rear curtain mounted on the rear window of the back seat, and a rear side curtain mounted on left and right side windows of the back seat.

The mode setting button may include a second button configured to automatically change the rear curtain for the manual mode and control the rear side curtain.

An exemplary embodiment of the present disclosure may prevent unnecessary actuating of the vehicle-mounted curtain by determining a boarding status of an occupant in the automatic mode.

In addition, an exemplary embodiment of the present disclosure may improve visibility of the back seat monitor by automatically controlling the vehicle-mounted curtain even if the automatic mode is not set.

DETAILED DESCRIPTION

Figure 1:
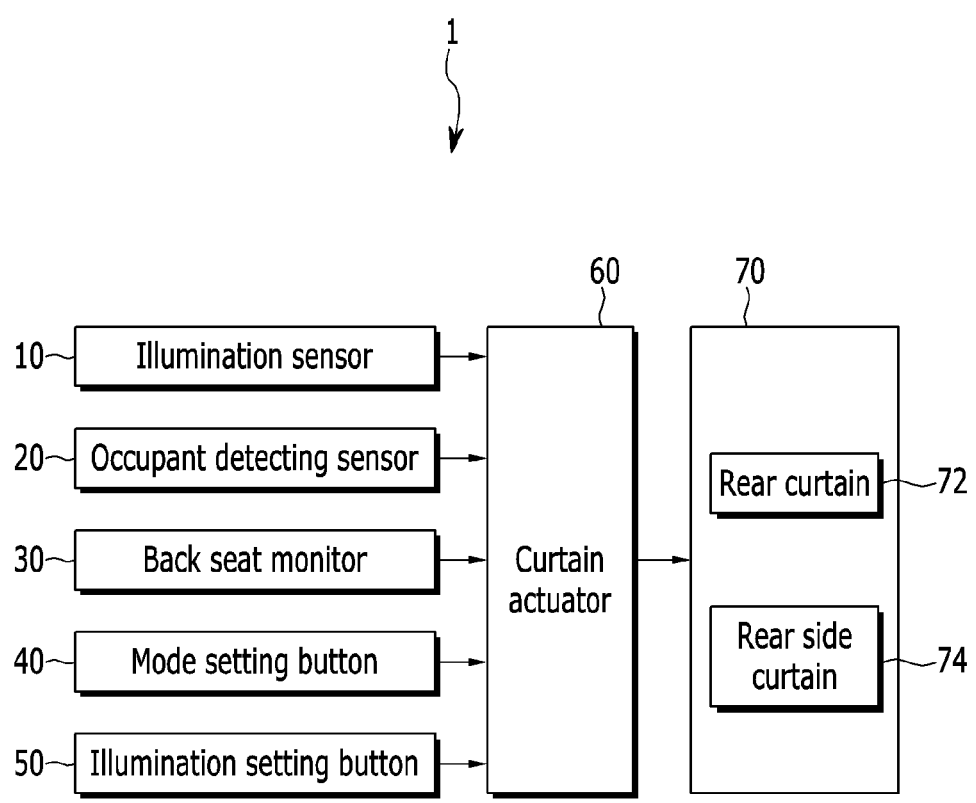
FIG. 1 is a schematic diagram of an apparatus for controlling a curtain of a vehicle according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

An exemplary embodiment of the present disclosure will hereinafter be described in detail with reference to the accompanying drawings.

Figure 2:
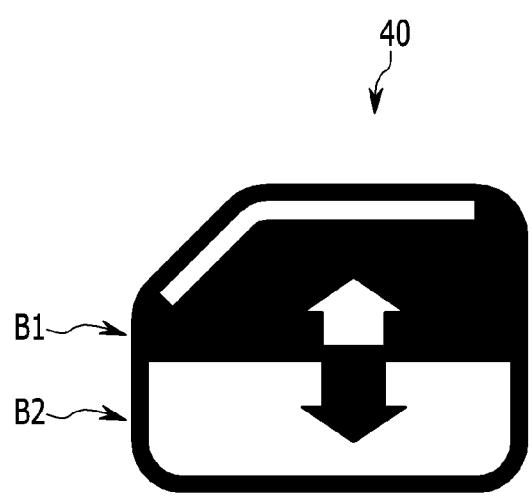
FIG. 2 illustrates a mode setting button as a partial apparatus of FIG. 1 according to an exemplary embodiment of the present disclosure.
Figure 3:
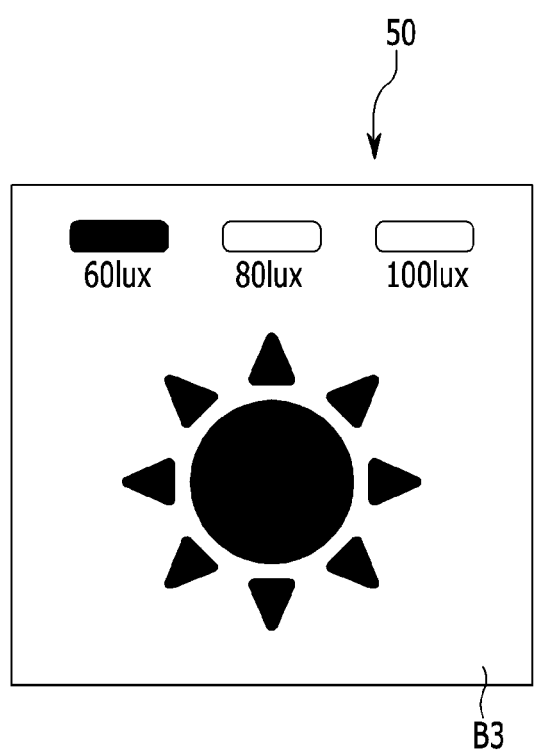
FIG. 3 illustrates an illumination setting button as a partial apparatus of FIG. 1 according to an exemplary embodiment of the present disclosure.

FIG. 1 is a schematic diagram of an apparatus for controlling a curtain of a vehicle according to an exemplary embodiment of the present disclosure. FIG. 2 illustrates a mode stetting button as a partial apparatus of FIG. 1. FIG. 3 illustrates an illumination setting button as a partial apparatus of the FIG. 1.

Referring to FIG. 1, an apparatus 1 for controlling a curtain of a vehicle according to an exemplary embodiment of the present disclosure includes an illumination sensor 10, an occupant detecting sensor 20, a back seat monitor 30, a mode setting button 40, an illumination setting button 50, a curtain actuator 60, and a vehicle-mounted curtain 70.

The illumination sensor 10 is turned on or off by the curtain actuator 60 and detects illumination of external light. The illumination sensor 10 may be mounted on a dashboard of the vehicle.

The illumination sensor 10 according to an exemplary embodiment of the present disclosure may use a sensor which is applied to an automatic light system for automatically turning on a headlamp of the vehicle depending on the illumination of the external light.

Generally, the auto light system turns on the illumination sensor 10 when a driver presses a lighting button (not shown), however, the illumination sensor 10 according to an exemplary embodiment of the present disclosure may be on/off controlled by the curtain actuator 60 as well as the lighting button. That is, the control apparatus according to an exemplary embodiment of the present disclosure does not include a plurality of illumination sensors on windows of the vehicle, but uses an illumination sensor mounted on the dashboard of the vehicle. Thus, the control apparatus according to an exemplary embodiment of the present disclosure does not need to include an extra illumination sensor.

The occupant detecting sensor 20 is turned on or off by the curtain actuator 60, and detects an occupant boarding a back seat of the vehicle. The occupant detecting sensor 20 may be mounted on the back seat of the vehicle, and may be a sensor which is applied to a passenger occupation detection system (PODS) for operating an air bag of the vehicle.

The back seat monitor 30 provides an image of the occupant boarding the back seat of the vehicle. The back seat monitor 30 may be mounted on the back side of a driver seat or a front passenger seat next to the driver seat.

The mode setting button 40 is operated by the occupant, and is set to either an automatic mode that opens or shuts the vehicle-mounted curtain 70 automatically or a manual mode that opens or shuts the vehicle-mounted curtain 70 manually.

The automatic mode may include a first automatic mode that automatically operates both a rear curtain 72 and a rear side curtain 74, and a second automatic mode that automatically operates only the rear side curtain 74. The rear curtain 72 is closed in order to prevent driving interruption in the second automatic mode.

For example, as shown in FIG. 2, the mode setting button 40 includes a first button B1 and a second button B2. If the first button B1 is pressed, the first automatic mode would be selected, and if the first button B1 is not pressed, the manual mode would be selected. In addition, if the second button B2 is pressed while the first button B1 is being pressed, the second automatic mode would be selected.

The mode setting button 40 of the control apparatus according to an exemplary embodiment of the present disclosure is not limited thereto. That is, the mode setting button 40 may further include a button (not shown) that automatically operates rear side curtains mounted on left and right side rear windows of the vehicle.

The illumination setting button 50 is operated by the occupant and sets one of a plurality of illumination values as a reference illumination value. For example, as shown in FIG. 3, the illumination setting button 50 may include a third button B3 which selects the reference illumination value among 60 lux, 80 lux, and 100 lux depending on the number of pressing time. The third button B3 displays a level of illumination depending on the number of pressing time.

The curtain actuator 60 automatically controls an operation of the vehicle-mounted curtain 70 according to a boarding status of the occupant in the back seat and the reference illumination value in the automatic mode. Moreover, the curtain actuator 60 controls an operation of the vehicle-mounted curtain 70 according to an operational status of the back seat monitor 30 and the reference illumination value in the manual mode.

The vehicle-mounted curtain 70 blocks out light coming into the vehicle by selectively opening and shutting depending on the curtain actuator 60. The vehicle-mounted curtain 70 may include the rear curtain 72 mounted on the rear window of the back seat and the rear side curtains 74 mounted on left and right side windows of the back seat.

Figure 4:
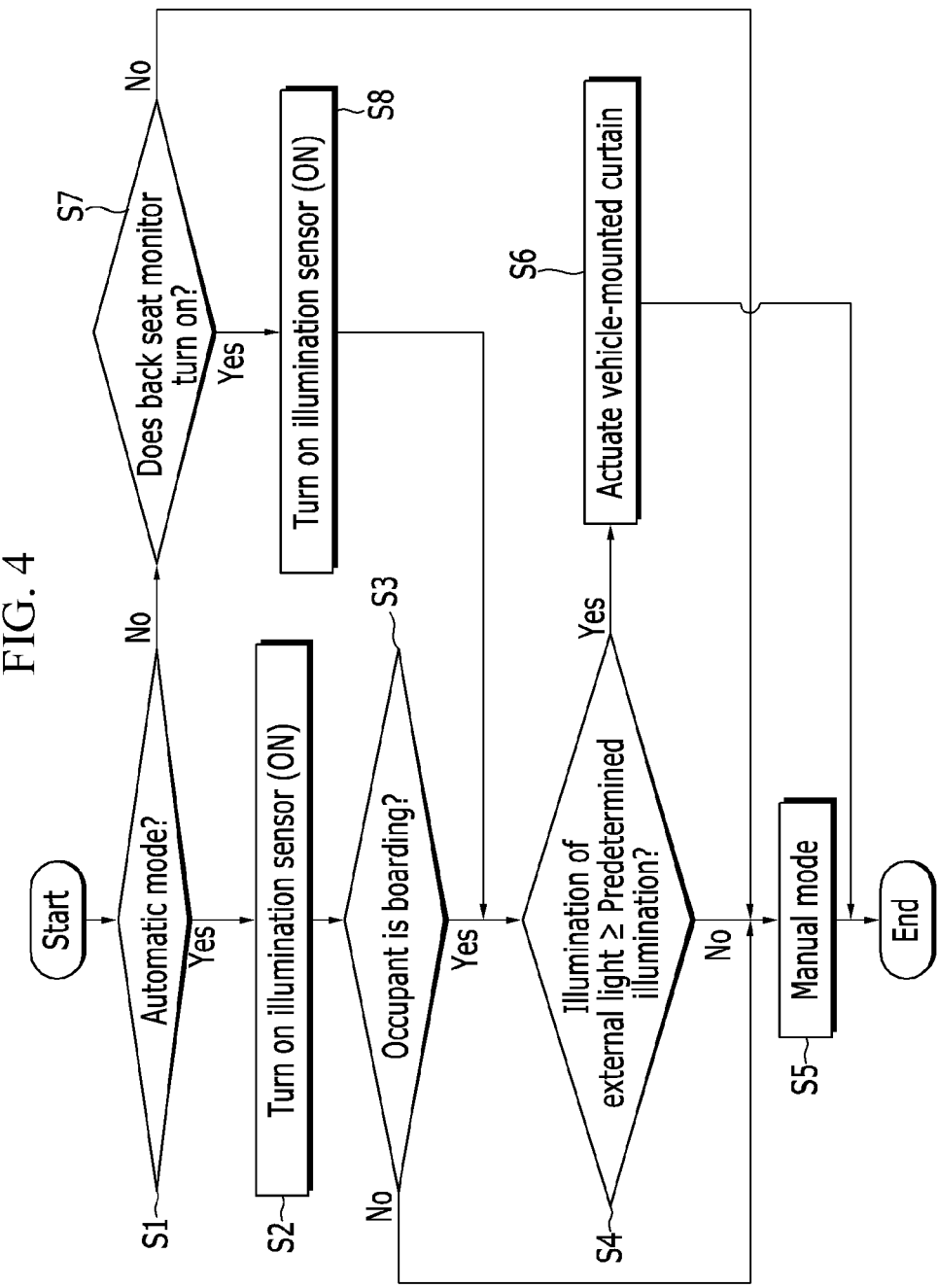
FIG. 4 is a flowchart showing a method for controlling a curtain of a vehicle according to an exemplary embodiment of the present disclosure.

FIG. 4 is a flowchart showing a method for controlling a curtain of a vehicle according to an exemplary embodiment of the present disclosure.

Referring to FIG. 4, the curtain actuator 60 determines whether an operating mode depending on the mode setting button 40 is an automatic mode at step S1. If the operating mode is the automatic mode at the step S1, the curtain actuator 60 turns on the illumination sensor 10 at step S2. Then, the illumination sensor 10 detects illumination of external light.

After that, the curtain actuator 60 turns on the occupant detecting sensor 20, and the occupant detecting sensor 20 detects a boarding status of an occupant. The curtain actuator 60 detects whether the occupant is in the back seat of the vehicle through the occupant detecting sensor 20 at step S3.

If the occupant is in the back seat of the vehicle at the step S3, the curtain actuator 60 determines whether the illumination of the external light detected by the illumination sensor 10 is greater than or equal to the reference illumination value depending on the illumination setting button 50 at step S4.

On the other hand, unless the occupant is in the back seat of the vehicle at the step S3, the curtain actuator 60 changes the automatic mode into the manual mode at step S5. At this time, the automatic mode that automatically actuates at least one of the rear curtain 72 and the rear side curtain 74 depending on the mode setting button 40 is determined, and the curtain actuator 60 controls a corresponding curtain automatically even if the occupant is not in the back seat of the vehicle.

If the illumination of the external light is greater than or equal to the reference illumination value at the step S4, the curtain actuator 60 actuates the vehicle-mounted curtain 70 at step S6. On the other hand, if the illumination of the external light is less than the reference illumination value at the step S4, the curtain actuator 60 proceeds to the step S5.

Unless the operating mode depending on the mode setting button 40 is the automatic mode at the step S1, the curtain actuator 60 determines whether the back seat monitor 30 is turned on at step S7.

If the back seat monitor 30 is turned on at the step S7, the curtain actuator 60 turns on the illumination sensor 10 at step S8. The curtain actuator 60 then proceeds to the step S4. On the other hand, if the back seat monitor 30 is turned off at the step S7, the curtain actuator 60 proceeds to the step S5.

That is, the curtain actuator 60 according to an exemplary embodiment of the present disclosure automatically actuates the vehicle-mounted curtain 70 when the automatic mode is predetermined, and the occupant is in the back seat of the vehicle. Therefore, the curtain actuator 60 can prevent the vehicle-mounted curtain 70 from being unnecessarily operated when the occupant is not presented in the back seat.

In addition, when the back seat monitor 30 is turned on, the curtain actuator 60 automatically actuates the vehicle-mounted curtain 70 even though the automatic mode is not set, such that visibility of the back seat monitor 30 can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for controlling a curtain of a vehicle, comprising:
   a back seat monitor configured to provide an image of an occupant;
   a vehicle-mounted curtain configured to block out external light;
   an illumination sensor configured to detect illumination of the external light;
   an occupant detecting sensor configured to detect a boarding status of the occupant; and
   a curtain actuator configured to automatically control an operation of the vehicle-mounted curtain according to the boarding status of the occupant and a reference illumination value in an automatic mode,
   wherein the curtain actuator further controls the operation of the vehicle-mounted curtain according to an operational status of the back seat monitor and the reference illumination value in a manual mode.

2. The apparatus of claim 1, wherein the curtain actuator turns on the illumination sensor in the automatic mode and controls the operation of the vehicle-mounted curtain by comparing the illumination of the external light detected by the illumination sensor with the reference illumination value if the occupant sits in a back seat.

3. The apparatus of claim 2, wherein the curtain actuator actuates the vehicle-mounted curtain if the illumination of the external light is greater than or equal to the reference illumination value, and changes the automatic mode into the manual mode if the illumination of the external light is less than the reference illumination value.

4. The apparatus of 1, wherein the curtain actuator actuates the illumination sensor when the back seat monitor is turned on and controls the operation of the vehicle-mounted curtain by comparing the illumination of the external light detected by the illumination sensor with the reference illumination value.

5. The apparatus of claim 4, wherein the curtain actuator actuates the vehicle-mounted curtain if the illumination of the external light is greater than or equal to the reference illumination value and changes the automatic mode into the manual mode if the illumination of the external light is less than the reference illumination value.

6. The apparatus of claim 1, wherein the illumination sensor is mounted on a dashboard of the vehicle.

7. The apparatus of claim 1, further comprising an illumination setting button configured to set the reference illumination value by selecting a plurality of illumination values.

8. The apparatus of claim 1, further comprising a mode setting button including a first button configured to set either the automatic mode or the manual mode.

9. The apparatus of claim 8, wherein the vehicle-mounted curtain comprises:
   a rear curtain mounted on a rear window of a back seat; and
   a rear side curtain mounted on left and right side windows of the back seat.

10. The apparatus of claim 9, wherein the mode setting button comprises a second button configured to change the rear curtain to the manual mode and automatically control the rear side curtain.

* * * * *